United States Patent
Mori (10) Patent No.: US 7,750,798 B2
(45) Date of Patent: Jul. 6, 2010

(54) WHEEL POSITION DETECTING DEVICE THAT VERIFIES ACCURACY OF DETECTION USING TRIGGER SIGNAL RECEPTION STRENGTH AND TIRE AIR PRESSURE DETECTING DEVICE INCLUDING THE SAME

(75) Inventor: Masashi Mori, Oobu (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 226 days.

(21) Appl. No.: 11/902,073

(22) Filed: Sep. 18, 2007

(65) Prior Publication Data

US 2008/0068148 A1    Mar. 20, 2008

(30) Foreign Application Priority Data

Sep. 19, 2006    (JP)    ............................. 2006-253042

(51) Int. Cl.
*B60C 23/00*    (2006.01)
(52) U.S. Cl. ................. 340/447; 340/425.5; 340/539.1; 340/444
(58) Field of Classification Search ................. 340/447, 340/442, 438, 425.5, 445, 443, 444, 448, 340/539.1, 531, 446
See application file for complete search history.

(56) References Cited

U.S. PATENT DOCUMENTS 3,873,965 A * 3/1975 Garcia ........................ 340/447
5,602,524 A    2/1997 Mock et al.
5,612,671 A * 3/1997 Mendez et al. .............. 340/447
6,604,416 B2 * 8/2003 Tsujita ....................... 73/146.5
6,838,985 B2 * 1/2005 Ghabra et al. ............... 340/445
7,131,323 B2 * 11/2006 Hirota .......................... 73/146
7,271,711 B2 * 9/2007 Daiss et al. .................. 340/447
7,574,293 B2 * 8/2009 Vredevoogd et al. .......... 701/36
2007/0008097 A1    1/2007 Mori et al.

FOREIGN PATENT DOCUMENTS

| JP | H07-507513 | 8/1995 |
| JP | 2005-335654 | 12/2005 |
| JP | 2007-015491 | 1/2007 |

\* cited by examiner

*Primary Examiner*—Daniel Previl
(74) *Attorney, Agent, or Firm*—Nixon & Vanderhye PC (57) ABSTRACT

A wheel position detecting device and a tire air pressure detecting device including the wheel position detecting device are provided. The wheel position detecting device judges whether reception strength data is correct or incorrect based on whether reception strength indicated by the reception strength data (the reception strength data expresses the reception strength of a trigger signal transmitted from a receiver, provided in a vehicle body, to a receiver of a transceiver on each wheel) transmitted back to the vehicle-mounted receiver from each wheel-mounted transceiver is within a range set in advance. A transceiver is provided on each wheel. The wheel position detecting device judges whether to decide the wheel position using the reception data.

14 Claims, 6 Drawing Sheets

FIG. 4A a ··· WHEN TRIGGERING DEVICE AND TRANSMITTER ARE CLOSEST
b ··· WHEN TRIGGERING DEVICE AND TRANSMITTER ARE FARTHEST

FIG. 4B c ··· WHEN TRIGGERING DEVICE AND TRANSMITTER ARE CLOSEST
d ··· WHEN TRIGGERING DEVICE AND TRANSMITTER ARE FARTHEST

FIG. 6

WHEEL POSITION DETECTING DEVICE THAT VERIFIES ACCURACY OF DETECTION USING TRIGGER SIGNAL RECEPTION STRENGTH AND TIRE AIR PRESSURE DETECTING DEVICE INCLUDING THE SAME

CROSS-REFERENCE TO RELATED APPLICATION

This application is based on and claims the benefit of priority from earlier Japanese Patent Application No. 2006-253042 filed on Sept. 19, 2006, the description of which is incorporated herein by reference.

BACKGROUND OF THE INVENTION

1. Field of the Invention

The present invention in general relates to a detecting technique and more particular to a wheel position detecting device that detects a wheel position on a vehicle, the wheel position detecting device is preferably applied to a tire air pressure detecting device that detects tire air pressure.

2. Description of the Related Art

Conventionally, a direct-type tire air pressure detecting device is known as a tire air pressure detecting device. In the direct-type tire air pressure detecting device, a transmitter including a sensor, such as a pressure sensor, is directly mounted on a wheel side of a vehicle. A tire is attached to the wheel. An antenna and a receiver are provided on the vehicle-body side. The tire air pressure detecting device operates as follows. After the transmitter transmits a detection signal from the sensor, the receiver receives the detection signal, via the antenna, and the tire air pressure detecting device performs tire air pressure detection.

The tire air pressure detecting device adds identification (ID) information (identifier) to data transmitted from the transmitter so that whether the transmitting data is that of the vehicle on which the tire air pressure detecting device is mounted (own vehicle) and the wheel on which the transmitter is mounted can be determined. The ID information is used to determine whether the vehicle is the own vehicle or another vehicle. The ID information is also used to determine the wheel on which the transmitter is mounted. The ID information is registered to the receiver in advance. When the data transmitted from the transmitter is received, the tire air pressure detecting device determines the wheel to which the data belongs using the received ID information (refer to, for example, Japanese Patent Publication No. 3212311).

When a user himself changes the position of the wheel, such as through tire rotation, the tire air pressure detecting device cannot respond to the change in the wheel position unless the ID information of the wheels of which the tires have been rotated by the user is read and the read ID information is registered to the receiver over current ID information.

SUMMARY OF THE INVENTION

In light of the above-described issues, an object of the present invention is that the tire position detecting apparatus can automatically respond to the change in the wheel position which occurred, for example, when the user rotates the tire positions. A further object of the present invention is to prevent erroneous wheel position detection caused by erroneous trigger signal reception strength data sent from a transmitter to a receiver.

To achieve the above-described objects, the invention provides a wheel position detecting device and a tire air pressure detecting device using the wheel position detecting device. The wheel position detecting device includes a receiver and a transmitter, described hereafter.

A transmitter is provided on each of a plurality of wheels. The wheel is provided with a tire. The transmitter Includes a receiving unit, a first controlling unit, and a transmitting unit. The receiving unit receives a trigger signal, via a reception antenna. The first controlling unit determines reception strength of the trigger signal received by the receiving unit and stores reception strength data indicating the reception strength in a frame to be transmitted. The transmitting unit transmits the frame processed by the first controlling unit, via a transmission antenna.

The receiver, provided on the vehicle-body side, includes a triggering device, a receiving unit, and a second controlling unit. The triggering device outputs a trigger signal so that a plurality of wheels among the plurality of wheels can receive the trigger signal. The receiving, unit receives the frame. The second controlling unit performs the wheel position detection based on the reception strength indicated by the reception strength data stored in the frame. In the wheel position detection, the wheel on which the transmitter is mounted is detected from among the plurality of wheels. The second controlling unit judges whether to use the reception strength data for the wheel position detection, based on whether the reception strength is within a predetermined range.

BRIEF DESCRIPTION OF THE DRAWINGS

A preferred form of the present invention is illustrated in the accompanying drawings in which.

DETAILED DESCRIPTION OF THE PREFERRED EMBODIMENTS

Exemplary embodiments of the present invention are below described in detail with reference to the attached drawings.

Embodiments

Figure 1:
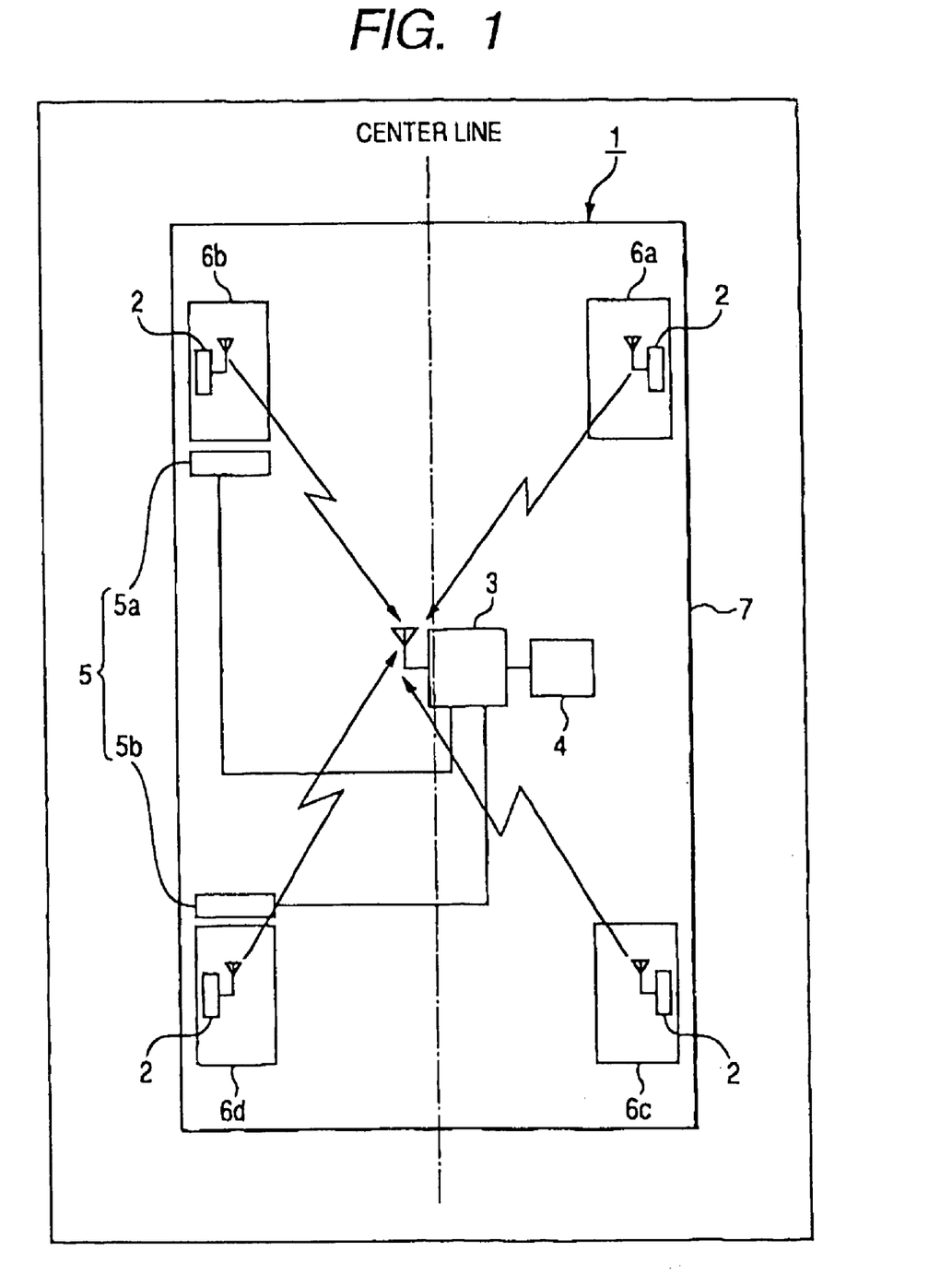
FIG. 1 is a diagram of an overall configuration of a tire air pressure detecting device to which a wheel position detecting device is applied, according to a first embodiment of the Invention.

FIG. 1 is a diagram of an overall configuration of a tire air pressure detecting device to which a wheel position detecting device is applied, according to a first embodiment of the invention. The upper section of FIG. 1 when the diagram is printed on paper indicates the front of a vehicle 1. The lower section of FIG. 1 indicates the rear of the vehicle 1.

As shown in FIG. 1, the tire air pressure detecting device is mounted on the vehicle 1. The tire air pressure detecting device includes transceivers 2, a receiver 3, a display 4, and triggering devices 5. According to the embodiment, the transceivers 2, the receiver 3, and the triggering devices 5 are equivalent to the wheel position detecting device of the exemplary embodiment.

A transceiver 2 is mounted on each of four wheels 6a to 6d (five wheels if a spare tire is included) of the vehicle 1. The transceiver 2 detects the air pressure of a tire attached to each wheel 6a to 6d. The transceiver 2 also stores detection signal data indicating a detection result in a frame to be transmitted and transmits the frame. The receiver 3 is mounted on a vehicle-body 7 side of the vehicle 1. The receiver 3 receives the frame transmitted from the transceiver 2. The receiver 3 also performs various processes, calculations, and the like based on the detection signal stored in the frame, thereby determining the tire air pressure.

Figure 2A:
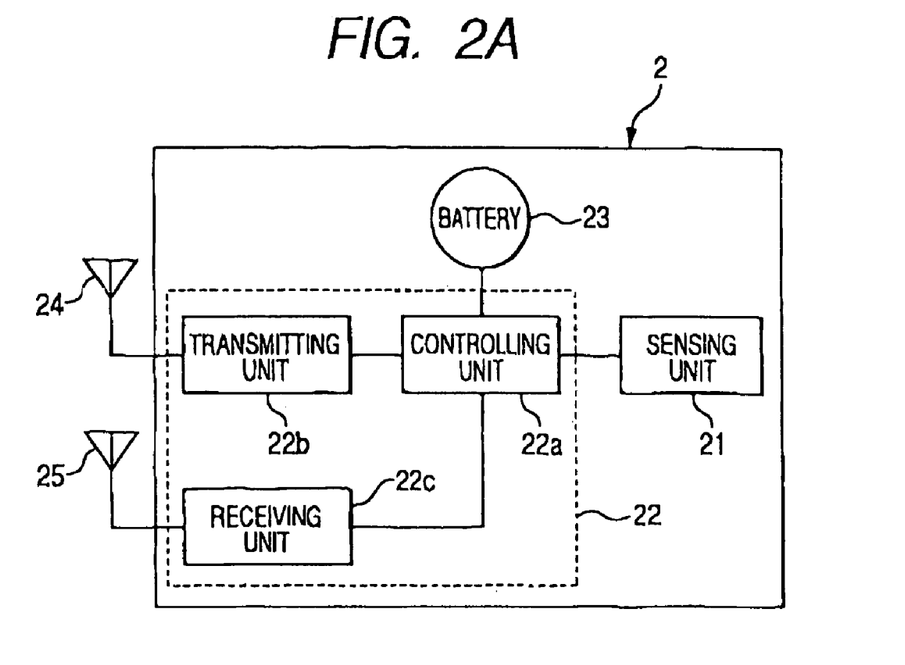
FIG. 2A is a block diagram of a transceiver.
Figure 2B:
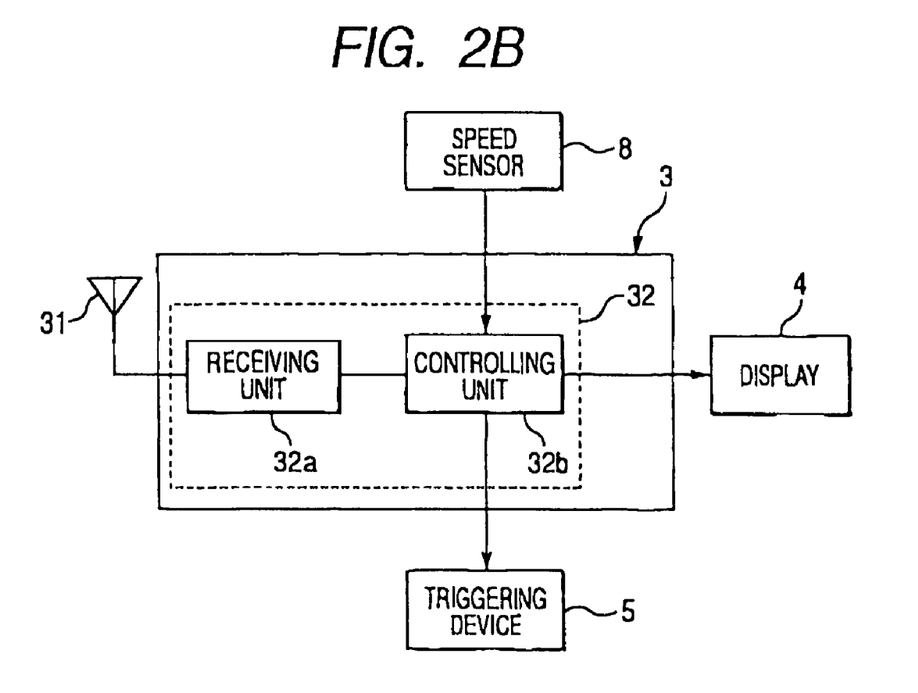
FIG. 2B is a block diagram of a receiver.

FIG. 2A and FIG. 2B are block diagrams of the transceiver 2 and the receiver 3. The transceiver 2 and the receiver 3 are sequentially described, hereafter.

As shown in FIG. 2A, the transceiver 2 includes a sensing unit 21, a microcomputer 22, a battery 23, a transmission antenna 24, and a reception antenna 25.

The microcomputer 22 is a known microcomputer including a controlling unit (a first controlling unit) 22a, a transmitting unit 22b, a receiving unit 22c, and the like. The microcomputer 22 performs a predetermined process using a program stored in a memory (not shown) in the controlling unit 22a.

The controlling unit 22a receives the detection signal related to the tire air pressure from the sensing unit 21 and performs signal processing on the received detection signal. The controlling unit 22a also processes the detection signal as required. The controlling unit 22a stores the processed detection signal, in addition to the ID information of each transceiver 2, in a frame to be transmitted. The detection signal is stored as data indicating the detection result (referred to, hereinafter, as tire air pressure-related data). Then, the controlling unit 22a transmits the frame to the transmitting unit 22b. The process for transmitting the signal to the transmitting unit 22b is performed at a predetermined cycle in adherence to the program.

In addition, the controlling unit 22a receives a trigger signal from the triggering device 5, via the reception antenna 25 and the receiving unit 22c. The controlling unit 22a performs signal processing on the trigger signal, thereby determining the reception strength of the trigger signal. The controlling unit 22a also processes the trigger signal as required. The controlling unit 22a stores trigger signal reception strength data in the frame storing the tire air pressure-related data or in a separate frame. The controlling unit 22a then transmits the frame to the transmitting unit 22b. The process for transmitting the signal to the transmitting unit 22b is also performed in adherence to the program.

The controlling unit 22a controls the timing at which the frame is transmitted to the transmitting unit 22b to prevent simultaneous transmissions of data from the transceivers 2. For example, a different transmission timing, indicating the number of seconds after the reception of the trigger signal that the frame is transmitted, is set in advance for each transmitter 3. Therefore, the respective transceivers 2 of the wheels 6a to 6d transmit the frames at different timings.

However, if a different transmission timing is merely stored in the controlling unit 22a of each transceiver 2 to enable each transceiver 2 of each wheel 6a to 6d to transmit the frame at a different timing, the content stored in each transceiver 2 differs. A shared program can be stored in the controlling unit 22a of all transceivers 2 can be shared if, for example, a map allowing the transmission timing to be selected depending on the reception strength or a function expression determining the transmission timing using transmission strength as a variable is stored in the controlling unit 22a, allowing the frame transmission timing to be shifted depending on the reception strength, and the respective transmission timings of the transceivers 2 differ by necessity as a result of the differences in the reception strengths.

The program stored in the controlling unit 22a can be set so that the transmission timing is randomly changed every time. When the transmission timing is randomly changed in this way, the probability that all transmission timings of the transceivers 2 differ becomes higher.

The transmitting unit 22b functions as an outputting unit that transmits the frame sent from the controlling unit 22a to the receiver 3, via the transmission antenna 24. The transmitting unit 22b uses radio frequency (RF) bandwidth, such as a 310 MHz radio wave.

The receiving unit 22c functions as an inputting unit that receives the trigger signal and transmits the received trigger signal to the controlling unit 22a, via the reception antenna 25.

The battery 23 supplies power to the controlling unit 22a and the like. Tire air pressure-related data collection performed by the sensing unit 21, various calculations performed by the controlling unit 22a, and the like are achieved through reception of the power supply from the battery 23.

The transceiver 2 configured as described above is, for example, mounted on an air injection valve in each wheel 6a to 6d. The transceiver 2 is disposed so that the sensing unit 21 is exposed on the inner side of the tire. As a result, the tire air pressure of the tire is detected. The frame is transmitted at a predetermined cycle (for example, every minute), via the transmission antenna 24 provided on each transceiver 2.

As shown in FIG. 2B, the receiver 3 includes an antenna 31 and a microcomputer 32.

The antenna 31 is a single, shared antenna that performs an overall reception of the frames each transmitted from a transceiver 2. The antenna 31 is fixed onto the vehicle-body 7.

The microcomputer 32 is a known microcomputer including a receiving unit 32a, a controlling unit (second controlling unit) 32b, and the like. The microcomputer 32 performs a predetermined process in adherence to a program stored in a memory (not shown) within the controlling unit 32b.

The receiving unit 32a functions as an Inputting unit that, when the frame transmitted from the transmitter 2 is received by the antenna 31, inputs the frame and transmits the frame to the controlling unit 32b.

The controlling unit 32b outputs a trigger instruction signal instructing the triggering device 5 to output the trigger signal. The controlling unit 32 receives the frame sent from the receiving unit 32a and performs wheel position detection, based on the trigger signal reception strength data of the transceiver 2 stored in the frame. In the wheel position detection, the controlling unit 32 identifies the wheel on which the transceiver 2, to which the frame belongs, is mounted from among the four wheels 6a to 6d.

Information related to speed is inputted from a speed sensor 8 to the controlling unit 32b and is also used for wheel position detection. A wheel position detection method will be described in detail hereafter.

The controlling unit 32b determines the tire air pressure by performing various kinds of signal processing, calculations, and the like, based on the data indicating the detection result stored in the received frame. The controlling unit 32b also outputs an electrical signal to a display 4, depending on the determined tire air pressure. For example, the controlling unit 32b compares the determined tire air pressure with a predetermined threshold value Th. When a decrease in the tire air pressure is detected, the controlling unit 32b outputs a signal indicating the decrease in the tire air pressure to the display 4. As a result, the display 4 is notified of the decrease in the tire air pressure in a wheel among the four wheels 6a to 6d.

The display 4 will be described (see FIG. 1). The display 4 is disposed in a location visible to a driver. The display 4 is, for example, a warning lamp provided on an instrument panel in the vehicle 1. For example, when a signal indicating the decrease in the tire air pressure is sent from the controlling unit 32b in the receiver 3, the display 4 displays a notification of the decrease, thereby notifying the driver of the decrease in the tire air pressure.

The triggering device 5 outputs the trigger signal when a trigger instruction signal sent from the controlling unit 32b in the receiver 3 is inputted. The trigger signal is a low frequency (LF) signal of, for example, 134 kHz and has a predetermined signal strength.

In this embodiment, the triggering device 5 is another device arranged to communicate with the receiver 3 and is located outside of the receiver 3. Alternatively, the triggering device 5 can be arranged to be a triggering unit 5 of the receiver 3.

According to the embodiment, two triggering devices 5 are used, a first triggering device 5a disposed on the front-wheel side and a second triggering device 5b disposed on the rear-wheel side. The field strength that can be used has an upper limit regulated by law. Therefore, if only one triggering device 5 is used, the radio wave may not reach all transceivers 2.

Therefore, according to the embodiment, the trigger signal transmitted from the first triggering device 5a reaches the transceivers 2 mounted on the right front wheel 6a and the left front wheel 6b. The trigger signal transmitted from the second triggering device 5b reaches the transceivers 2 mounted on the right rear wheel 6c and left rear wheel 6d.

Each triggering device 5 is disposed to be offset from a center line bilateral-symmetrically dividing the vehicle 1. As a result, each triggering device 5 is a different distance away from the corresponding wheels. According to the embodiment, the first triggering device 5a is disposed near the left front wheel 6b. The second triggering device 5b is disposed near the left rear wheel 6d. Both triggering devices 5 are disposed closer to the left-hand side than to the center line.

Therefore, the distance from the first triggering device 5a to the right front wheel 6a is longer than the distance from the first triggering device 5a to the left front wheel 6b. The distance from the second triggering device 5b to the right rear wheel 6c is longer than the distance from the second triggering device 5b to the left rear wheel 6c.

The triggering device 5 can be mounted anywhere as long as the location is not completely covered by metal. The triggering device 5 is preferably mounted on a location that is not covered by metal and is not hit by stones and the like while moving, such as within a liner or within the interior of the vehicle 1.

The tire air pressure detecting device to which the wheel position detecting device is applied according to the embodiment is configured as described above.

Next, a wheel position detection method used by the tire air pressure detecting device according to the embodiment will be described.

Figure 3:
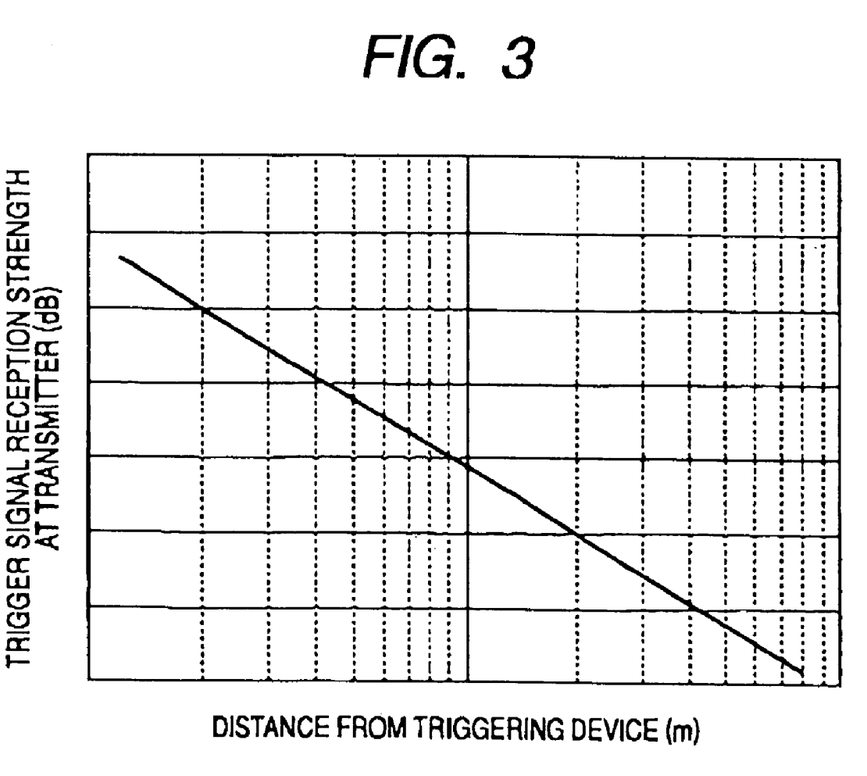
FIG. 3 is a diagram of a relationship between a distance from a triggering device to a transmitter and reception strength of a trigger signal received by the transceiver.

FIG. 3 shows a relationship between the distance from the triggering device 5 to the transceiver 2 and the reception strength of the trigger signal received by the transceiver 2. As shown in FIG. 3, in free space, the trigger signal reception strength (field strength of the radio wave) weakens depending on the distance from the triggering device 5 to the transceiver 2. Therefore, the trigger signal reception strength at the transceiver 2 tends to decrease as the distance from the triggering device 5 to the transceiver 2 increases.

The distance from a single triggering device 5 to each wheel differs. According to the embodiment, the distance from the first triggering device 5a to the right front wheel 6a is longer than the distance to the left front wheel 6b. Therefore, between the reception strengths of the trigger signal received by the transceiver 2 mounted on the wheel 6a and of that received by the transceiver 2 mounted on the wheel 6b, the reception strength of the trigger signal received by the transceiver 2 connected to the right front wheel 6a is weaker.

Whether the transceiver 2 is mounted on the right front wheel 6a or the left front wheel 6b can be determined through a comparison of the trigger signal reception strengths. Similarly, whether the transceiver 2 is mounted on the right rear wheel 6c or the left rear wheel 6d can be determined through the comparison of the trigger signal reception strengths.

According to the embodiment, the reception strength of the trigger signal received by each transceiver 2 is sent to the receiver 3. The receiver 3 determines the wheel on which each transceiver 2 is mounted from among the wheels 6a to 6d, based on the relationship between the trigger signal reception strength and the distances from the triggering device 5 to each transceiver 2.

However, the trigger signal reception strength of which notice is given to the receiver 3 is not necessarily accurate, such as in the following situations. For example, a problem of some sort occurs, such as the reception strength itself of the trigger signal transmitted from the triggering device 5 being an unexpected, abnormal value. Alternatively, the trigger signal reception strength data transmitted from the transceiver 2 differs from the reception strength that has actually been received, as a result of an error occurring during the signal processing performed within the transceiver 2. Therefore, the trigger signal reception strength data is required to be verified, and whether the data can be used for wheel position detection or the trigger signal is to be outputted and the trigger signal reception strength measured by each transceiver 2 again is required to be decided.

Figure 4A:
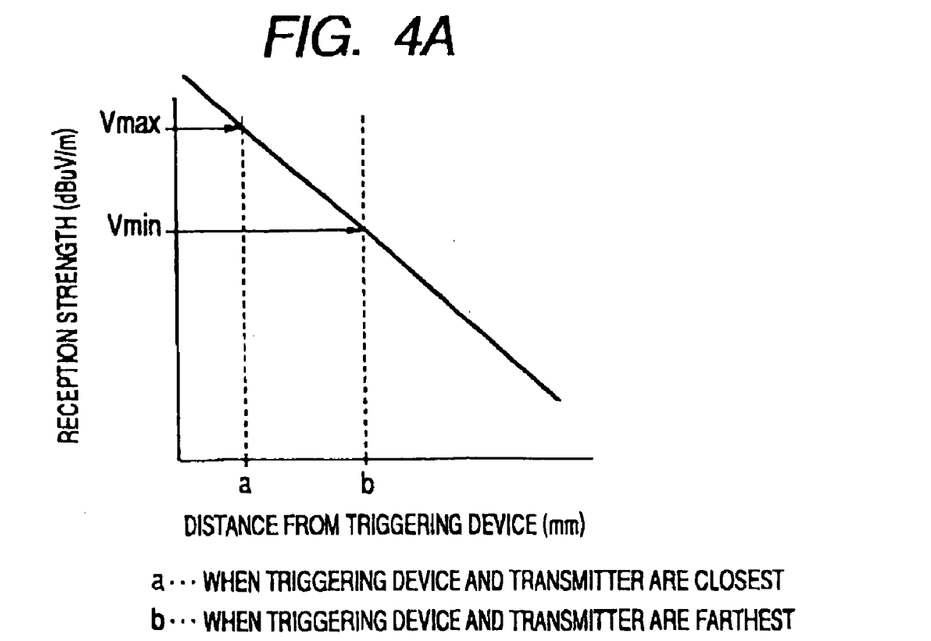
FIG. 4A is a graph of a relationship between the distance from the triggering device to the transceiver and the reception strength of the trigger signal of a left-hand side wheel disposed near the triggering device.
Figure 4B:
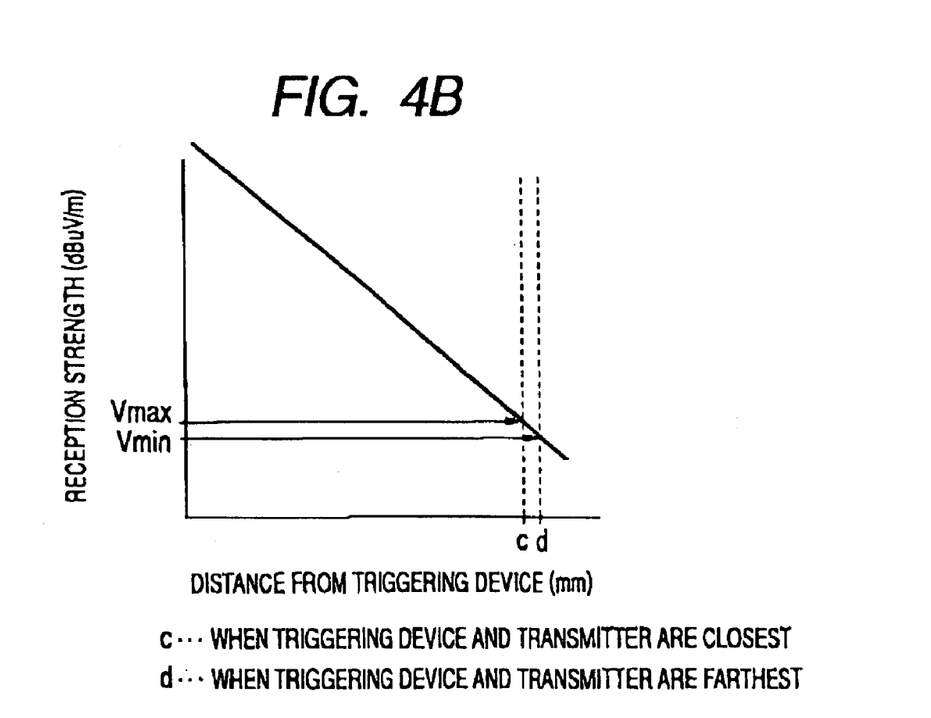
FIG. 4B is a graph of a relationship between the distance from the triggering device to the transceiver and the reception strength of the trigger signal of a right-hand side wheel disposed away from the triggering device.

The verification of whether the trigger signal reception strength data is correct or incorrect can be performed based on the following idea. FIG. 4A and FIG. 4B are graphs showing the relationship between the distances from the triggering device 5 to each transceiver 2 and the trigger signal reception strength. FIG. 4A shows the relationship involving the left wheels 6b and 6d disposed near the triggering device 5. FIG. 4B shows the relationship involving the right wheels 6a and 6c disposed away from the triggering device 5.

The distance between the triggering device 5 and the transceiver 2 changes with the rotation of the wheels 6a to 6d. When the distance when the transceivers 2 mounted on the left wheels 6b and 6d are closest to the corresponding triggering device 5 is a and the distance when the transceivers 2 are the farthest is b, a maximum value Vmax(L) and a minimum value Vmin(L) of the reception strength are each expressed by the following equations, based on the distances a and b and the strength (referred to, hereafter, as trigger output ltrig[x]) of the trigger signal outputted from the triggering device 5.

The trigger output ltrig(x) indicates a value ltrig(3000) when the triggering device 5 outputs the trigger signal and the signal strength is measured at a location that is a predetermined distance, in millimeters (three meters, herein), away from the triggering device 5. β indicates a correction value taking into consideration effects of the setting position of the triggering device 5, external environment, and the like (in other words, effects excluding the effect the vehicle-body has on the trigger signal).

$$V\max(L) = \text{trigger output } \mathit{Itrig}(3000) + 60 \times \log(3000/a) + \beta \quad \text{(Equation 1)}$$

$$V\min(L) = \text{trigger output } \mathit{Itrig}(3000) + 60 \times \log(3000/b) + \beta \quad \text{(Equation 2)}$$

Therefore, the range of the reception strengths of the trigger signals received by the transceivers 2 mounted on the left wheels 6b and 6d is from Vmin(L) to Vmax(L).

As a result, whether the data is correct or incorrect can be verified when whether the reception strength data sent from the receiver 3 is within the range is judged.

Similarly, if the distance when the transceivers 2 mounted on the right wheels 6a and 6c are closest to the corresponding triggering device 5 is c and the distance when the transceivers 2 are the farthest is d, the maximum value V(max)(R) and the minimum value Vmin(R) are each expressed by the following equation, based on the distances c and d and the trigger output. α is a correction value taking into consideration an effect the vehicle-body has on the trigger signal. The value is decided based on the vehicle type.

$$V\max(R) = \text{trigger output } \mathit{Itrig}(3000) + 60 \times \log(3000/c) + \alpha + \beta \quad \text{(Equation 3)}$$

$$V\min(R) = \text{trigger output } \mathit{Itrig}(3000) + 60 \times \log(3000/d) + \alpha + \beta \quad \text{(Equation 4)}$$

Therefore, the range of the reception strengths of the trigger signals received by the transceivers 2 mounted on the right wheels 6a and 6c is from Vmin(R) to Vmax(R).

As a result, whether the data is correct or incorrect can be verified when whether the reception strength data sent from the receiver 3 is within the range is judged. The wheel position detection is performed based on a verification method such as this.

The equations 1 to 4 describes the method of determining the reception strength of the trigger signal at each transceiver 2 mounted on the wheels 6a to 6d, when each triggering device 5a and 5b outputs the trigger signal. However, the correction value β and the correction value α within the equations described above change depending on the extent to which factors expected to affect the reception strength are taken into consideration in advance. Therefore, the range of the reception strength may vary to a degree depending on the correction method.

Next, an operation performed by the tire air pressure detecting device according to the embodiment will be described. First, the tire air, pressure detecting device performs the wheel position detection when an ignition switch (not shown) is switched from OFF to ON. The wheel position detection is performed as a result of the controlling unit 32b of the receiver 3 performing a wheel position detection process.

Figure 5:
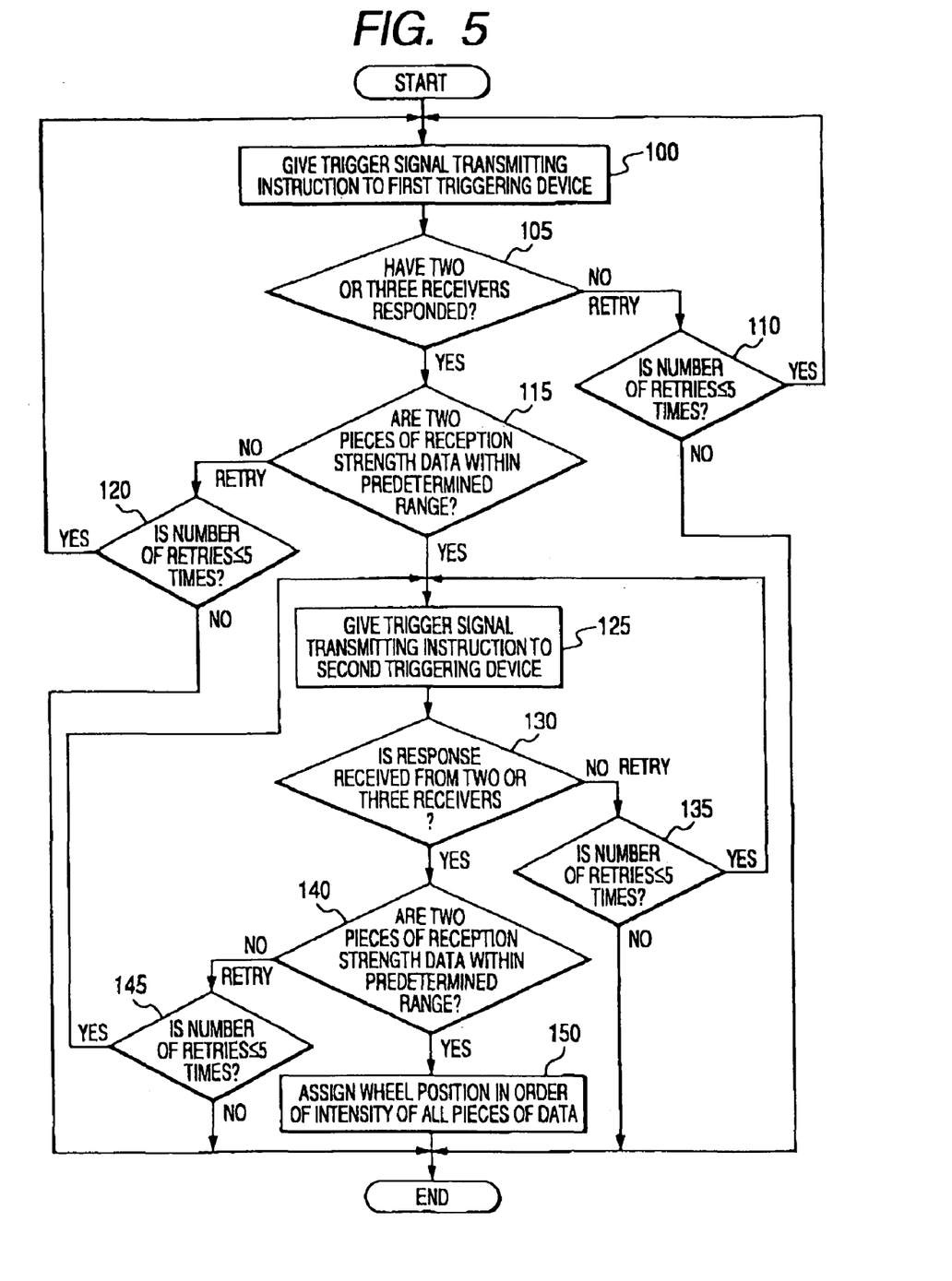
FIG. 5 is a flowchart of a wheel position detection process performed by a controlling unit in the receiver.

FIG. 5 is a flowchart of the wheel position detection process performed by the controlling unit 32b of the receiver 3. The wheel position detection process is performed when the ignition switch (not shown) is switched from OFF to ON and the power of the controlling unit 32b of the receiver 3 is turned ON.

At Step 100, the controlling unit 32b outputs a trigger instruction signal to the first triggering device 5a after a predetermined period has elapsed after the power has been turned ON. When the trigger instruction signal is inputted into the first triggering device 5a, the first triggering device 5a outputs a trigger signal of a predetermined signal strength towards the transceivers 2 mounted on the right front wheel 6a and the left front wheel 6b.

When the trigger signal is inputted into the controlling unit 22a, via the antenna 25 and the receiving unit 22c of each transceiver 2 mounted on the right front wheel 6a and the left front wheel 6b, the controlling unit 22a enters a wake-up state and measures the reception strength of the received trigger signal.

When the trigger signal reception strength is determined, each transceiver 2 stores the trigger signal reception strength in a frame to be transmitted, in addition to ID information (identifier) added to differentiate each transceiver 2. The frame is then transmitted towards the receiver 3.

At this time, the transmission timings of the respective transceivers 2 differ from each other. Therefore, cross-talk does not occur between the frames sent from the transceivers 2. The receiver 3 can receive the frame with certainty.

Next, at Step 105, whether a predetermined number of transceivers 2 have responded to the trigger signal outputted from the first triggering device 5a is judged.

The predetermined number of transceivers 2 mentioned here is assumed to be, for example, two or three transceivers 2. The predetermined number differs depending on the vehicle 1. In other words, if only the two transceivers 2 mounted on the front wheels 6a and 6b are expected to receive the trigger signal outputted from the first triggering device 5a, the predetermined number is two. If the transceiver 2 mounted on the left rear wheel 6d that is a relatively short distance from the first triggering device 5a is also expected to receive the trigger signal, the predetermined number is three. The number changes depending on the signal strength of the trigger signal, the distances from the first triggering device 5a to the back wheels 6c and 6d, and the like. Therefore, the predetermined number can be four depending on the conditions.

The transceivers 2 may not be able to receive the trigger signal when the trigger signal output strength is affected by the surrounding environment of the vehicle 1, such as when a road surface is formed from iron plates or when the vehicle 1 is parked near a facility or equipment emitting radio interference. When at least one of either of the two transceivers 2 mounted on the front wheels 6a and 6b cannot receive the trigger signal, the frames cannot be sent from the two transceivers 2.

In this case, two or more transceivers 2 may not be able to respond. The judgment result at Step 105 is NO. When the judgment result is NO, the controlling unit 32b proceeds to Step 110 to retry each of the above-described processes. A counter value of a counter (not shown) installed in the controlling unit 32b is incremented by one, and the number of re-tries is stored.

At Step 110, whether the number of re-tries is equal to or less than five times is judged. When the number of re-tries is equal to or less than five times, the controlling unit 32b returns to Step 100 and retries the process. If the number of re-tries exceeds five times, the controlling unit 32b stops the process without retrying the process. In this case, a transceiver 2 failure, a dead battery, and the like are thought to have occurred. Therefore, a notification of the number of re-tries exceeding five times can be given through the display 4.

At the same time, when the judgment result at Step 105 is YES, the controlling unit 32*b* proceeds to Step 115. The controlling unit 32*b* judges whether the reception strength data stored in the received frame is within the ranges set in advance. The ranges set in advance refer to the two ranges described above, Vmin(L) to Vmax(L) and Vmin(R) to Vmax (R).

When the reception strength data meets a condition in which a piece of reception strength data is within the range Vmin(L) to Vmax(L) and another piece of reception strength data is within the range Vmin(R) to Vmax(R), the judgment result is YES. When the condition is not met, the judgment result is NO. The reason for performing a judgment such as this will be explained.

The first triggering device 5*a* basically outputs the trigger signal to the transceivers 2 of the front wheels 6*a* and 6*b*. However, the transceiver 2 mounted on the left rear wheel 6*d*, disposed relatively close to the first triggering device 5*a*, may also receive the trigger signal.

In this case, the transceiver 2 mounted on the left rear wheel 6*d* also responds and transmits a frame that is received by the receiver 3. Therefore, for example, if a transceiver 2 among the transceivers 2 mounted on the front wheels 6*a* and 6*b* is broken, and the transceiver 2 mounted on the left rear wheel 6*d* also transmits the frame, the judgment result at Step 105 is YES. However, the reception strength data that are required to be acquired here are of the transceivers 2 mounted on the front wheels 6*a* and 6*b*. Therefore, whether the acquired reception data are really those of the transceivers 2 mounted on the front wheels 6*a* and 6*b* is required to be verified.

At this time, as explained in the description of the verification method above, the reception strengths of the trigger signals at the transceivers 2 mounted on the front wheels 6*a* and 6*b* are each within the range Vmin(L) to Vmax(L) and the range Vmin(R) to Vmax(R). However, the reception strength of the trigger signal at the transceiver 2 mounted on the left rear wheel 6*d* is not within the range.

Therefore, when the receiver 3 receives the frames including the reception strength data from the transceivers 2 mounted on the front wheels 6*a* and 6*b*, the above-described condition is met, However, even if two or more frames are received, the condition cannot be met unless the received frames are sent from the transceivers, 2 mounted on the front wheels 6*a* and 6*b*.

In this way, whether the trigger signal reception strength data have been successfully transmitted from the transceivers 2 mounted on the front wheels 6*a* and 6*b*, or in other words, whether the reception strength data are correct can be verified.

If the judgment result is NO, the controlling unit 32*b* proceeds to Step 120. The counter value of the counter (not shown) installed in the controlling unit 32*b* is incremented by one, and the number of re-tries is stored. Next, as at Step 110, the controlling unit 32*b* judges whether the number of re-tries is equal to or less than five times. When the number of re-tries is equal to or less than five times, the controlling unit 32*b* returns to Step 100 and retries the process. If the number of re-tries exceeds five times, the controlling unit 32*b* stops the process without retrying the process. If the judgment result is YES, the controlling unit 32*b* proceeds to Step 125.

The processes are exactly the same as those performed for the front wheels 6*a* and 6*b*. Therefore, explanations thereof are omitted. As a result of these processes being performed, whether the trigger signal reception strength data have been successfully transmitted from the transceivers 2 mounted on the rear wheels 6*c* and 6*d*, or in other words, whether the reception strength data are correct can be confirmed.

In the process at Step 130, as in the process at Step 105 described above, whether the predetermined number of transceivers 2 has responded is judged. A spare tire (not shown) may be disposed near the rear wheels 6*c* and 6*d*. A transceiver 2 may be mounted on the spare tire.

In this case, the predetermined number is set taking into consideration the frame sent from the transceiver 2 mounted on the spare tire. In other words, when the spare tire is not taken into consideration, the trigger signal is expected to be received by only the transceivers 2 mounted on the rear wheels 6*c* and 6*d* or, in addition to the transceivers 2, the transceiver 2 mounted on the left front wheel 6*b*. Therefore, the predetermined number of transceivers 2 is two or three.

When the spare tire is taken into consideration, the predetermined number increases by one and becomes three or four. The predetermined number changes depending on the signal strength of the trigger signal, the distances from the first triggering device 5*a* to the rear wheels 6*c* and 6*d*, and the like. Therefore, depending on the conditions, the predetermined number may be further increased by one.

Next, at Step 150, the controlling unit 32*b* reads the ID information stored in the frame storing the reception strength data judged to be within the range at Step 115 and arranges the ID information in order, from the ID information with the highest reception strength. The ID information with the higher reception strength is determined to be that of the transceiver 2 mounted on the left front wheel 6*b*. The ID information with the lower reception strength is determined to be that of the transceiver 2 mounted on the right front wheel 6*a*.

The controlling unit 32*b* corresponds the ID information stored in each frame with the right front wheel 6*a* and the left front wheel 6*b* on which the transceivers 2 are mounted and stores (registers) the ID information in the memory within the controlling unit 32*b*.

Similarly, at Step 150, the controlling unit 32*b* reads the ID information stored in the frame storing the reception strength data that is within the range and arranges the ID information in order, from the ID information with the highest reception strength. The ID information with the higher reception strength is determined to be that of the transceiver 2 mounted on the left rear wheel 6*d*, The ID information with the lower reception strength is determined to be that of the transceiver 2 mounted on the right rear wheel 6*c*.

The ID information stored in each frame is corresponded with the right rear wheel 6*c* and the left rear wheel 6*d* on which the transceivers 2 are mounted and stored (registered) in the memory within the controlling unit 32*b*. The wheel position detection process is completed.

In this way, when the receiver 3 performs the tire air pressure detection, described hereafter, and a frame storing tire air pressure-related data is transmitted, the receiver 3 can determine the wheel on which the transceiver 2 that has transmitted the frame is mounted from among the four wheels 6*a* to 6*d*, using the ID information stored in the frame. The receiver 3 can determine the tire air pressure of each wheel 6*a* to 6*d*. As a result, the wheel on which each transceiver 2 is mounted can be detected from among the wheels 6*a* to 6*d* without the user being required to read the ID information or the like.

Hereafter, the tire air pressure detecting device using the wheel position detecting device, described above, will be described.

The tire air pressure detecting device performs the tire air pressure detection after the wheel position detection is performed as described above.

Specifically, the tire air pressure detecting device enters periodic transmission mode. As described above, in each transceiver 2, the detection signal from the sensing unit 21 indicating the tire air pressure and the temperature within the tire is inputted into the controlling unit 22a. The signal processing is performed as required on the detection signal, and the detection signal becomes tire air pressure-related data. The tire air pressure-related data, in addition to the ID information of the transceiver 2, is stored in the frame to be transmitted. Subsequently, the frame is transmitted to the receiver 3 side, via the transmitting unit 22b, at a predetermined cycle.

At the same time, when the transceiver, 2 transmits the frame, the antenna 31 of the receiver 3 receives the frame. The frame is inputted into the controlling unit 32b, via the receiving unit 32a. The controlling unit 32b extracts the data indicating the tire air pressure and the data indicating the temperature within the tire from the received frame. The controlling unit 32b performs temperature correction as required, based on the data indicating the temperature, and determines the tire air pressure.

The ID information is stored in the frame. Therefore, the ID information is collated with the ID information stored during wheel position detection. The wheel on which the transmitter 2 from which the frame has been sent is mounted is determined from among the four wheels 6a to 6d.

When a difference between the determined tire air pressure and a previously determined tire air pressure does not exceed a predetermined threshold value and the change in the tire air pressure is small, the cycle at which the tire air pressure is detected remains as is (such as every minute). When the predetermined threshold value is exceeded and the change in the tire air pressure is large, the cycle is quickened (such as every five seconds).

If the determined tire air pressure is judged to be lower than the predetermined threshold value, the controlling unit 32b outputs a signal notifying the display 4 of the judgment. The notification is displayed by the display 4 so that the wheel having the decreased tire air pressure is identified from among the four wheels 6a to 6d. As a result, the driver can be notified of the wheel among the wheels 6a to When the ignition switch is switched from ON to OFF, the controlling unit 32b of the receiver 3 again outputs the trigger instruction signal to the triggering device 5. The triggering device 5 outputs the trigger signal. When the trigger signal is inputted into the controlling unit 22a, via the reception antenna 25 and the receiving unit 22c, the transceiver 2 switches to a sleep state. As a result, the tire air pressure detection performed by the tire air pressure detecting device is completed.

Figure 6:
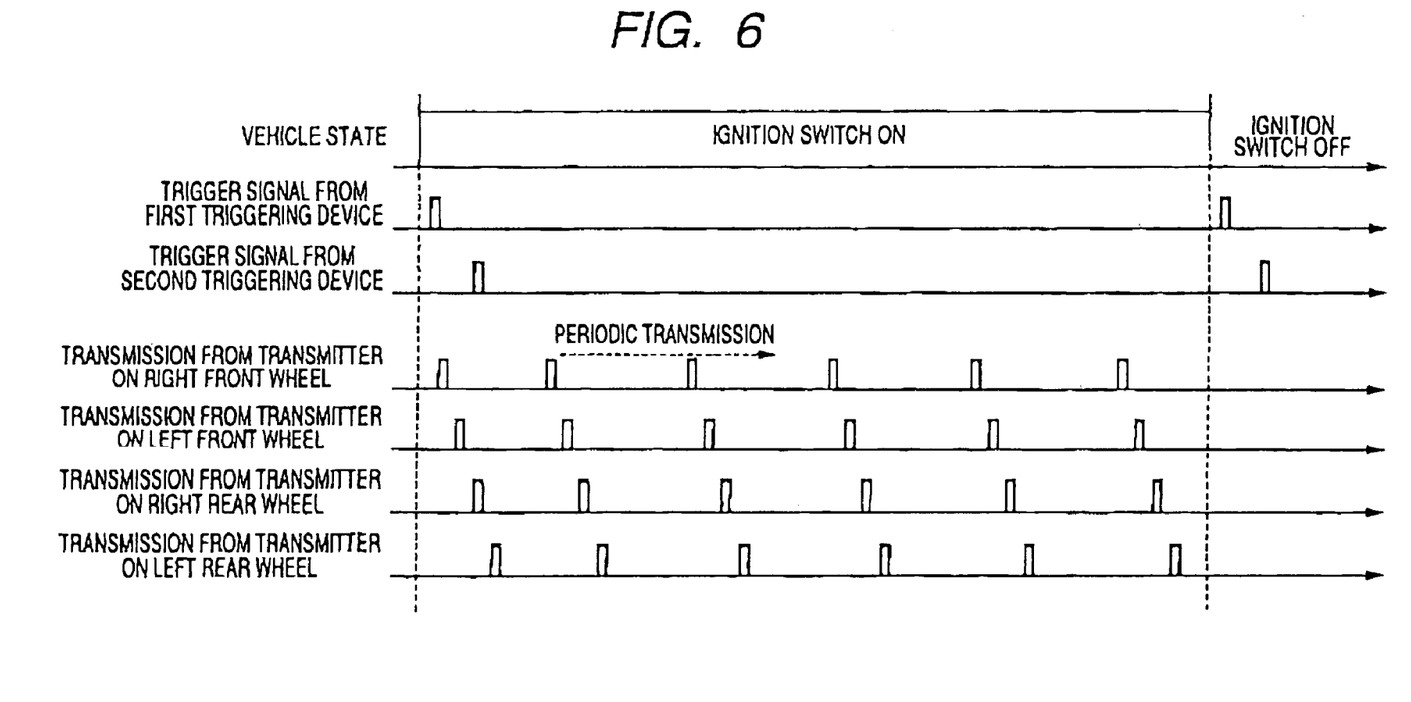
FIG. 6 is a timing chart of when the wheel position detection process and a tire air pressure detection process are performed.

For reference, a timing chart of when the wheel position detection process and the tire air pressure detection process, described above, are performed is shown in FIG. 6. As shown in the diagram, the first triggering device 5a and the second triggering device 5b successively output the trigger signals simultaneously with the ignition switch being turned ON. In response, each transceiver 2 mounted on the wheels 6a to 6d transmits the frame storing the reception strength data and the ID information, When the receiver 3 receives the frames, the receiver 3 switches to periodic transmission mode. The tire air pressure detection is performed until the ignition switch is switched to OFF.

Hereafter, advantages achieved by the invention according to the embodiment will be described.

As described above, according to the embodiment, whether the reception strength data is correct or incorrect is judged based on whether the reception strength indicated by the reception strength data transmitted from each transceiver 2 is within the range set in advance. Whether the reception strength data is used is then judged.

Therefore, use of incorrect reception strength data can be prevented. The occurrence of erroneous wheel position detection can also be prevented. If a frame storing data including the reception strength data and the like is received by mistake from a transmitter of another vehicle in which the same system is installed, whether the reception strength is that of the own vehicle or another vehicle can be identified based on whether the reception strength indicated in the reception strength data is within the range set in advance. Therefore, use of erroneous data from another vehicle can be prevented.

When each triggering device 5a and 5b outputs the trigger signals, the number of transceivers 2 that will respond is set in advance. When the actual number of responding transceivers 2 differs from the set number, the reception of the frame is unsuccessful. When the frame cannot be received and when the reception strength data cannot be used, such as in the situations described above, the controlling unit 32b again outputs the trigger signal from the triggering device 5 and requests the reception strength data.

Therefore, the wheel position detection can still be performed even if the frame cannot be received or the reception strength data once transmitted from the transceiver 2 is incorrect. The correct reception strength data can be acquired by repeated tries and the wheel position detection can be performed.

Such re-tries need only be performed on the wheel of which the reception strength data cannot be successfully acquired. Therefore, the trigger signal is only required to be outputted from the triggering device that corresponds with the wheel among the triggering devices 5a and 5b.

The re-tries are preferably performed while the vehicle 1 is moving. For example, when the trigger signal is outputted when the position of the transceiver 2 happens to be in a location where the trigger signal reception is difficult or the like, the transceiver 2 may again be unable to receive the trigger signal if the re-try is performed while the transceiver 2 is in the same location.

If the re-try is performed while the vehicle 1 is moving, the position of the transceiver 2 changes. Therefore, the possibility of the trigger signal being received can be increased. Detection of whether the vehicle 1 is moving can be performed based on the signal from the speed sensor 8 inputted into the controlling unit 32b. The receiver 3 can transmit a trigger signal outputting instruction to the triggering device 5 when a condition, such as the generation of speed, is met.

The controlling unit 32b can detect whether the vehicle 1 is moving. When the vehicle 1 is moving, the controlling unit 32b can instruct the triggering device 5 to output the trigger signal.

Alternatively, the controlling unit 32b can include means (115 and 140) of judging whether the number of pieces of reception strength data including the reception strength that is within the range set in advance, among the pieces of reception data, is a number decided in advance. When the number of pieces of reception data is not the number decided in advance, the controlling unit 32b can instruct the triggering device to output the trigger signal.

As a result, when the trigger signal is outputted while the position of the transceiver 2 happens to be in a location where the trigger signal reception is difficult or the like, the transceiver 2 may not be able to receive the trigger signal if the re-try is performed while the transceiver 2 is in the same location. If the re-try is performed while the vehicle 1 is moving, the position of the transceiver 2 changes. Therefore, the possibility of the trigger signal being received can be increased.

When the triggering device 5 includes the first triggering device 5a and the second triggering device 5, and the controlling unit 32b cannot successfully receive the reception strength data, the controlling unit 32b preferably instructs only the triggering device that outputs the trigger signal to the wheel that cannot successfully receive the reception strength data, among the first triggering device 5a and the second triggering device 5b, to output the trigger signal. As a result, unnecessary communication is not required to maintain the accuracy of the wheel position detection. The first triggering device 5a outputs the trigger signal to some of the wheels (6a and 6b) among the plurality of wheels. The second triggering device 5b outputs the trigger signal to other wheels (6c and 6d) among the plurality of wheels.

All advantages of the wheel position detecting device described above can be achieved in the tire air pressure detecting device including the wheel position detecting device.

Variation Examples

According to the embodiment, the first triggering device 5a is disposed on the front wheels 6a and 6b side. The second triggering device 5b is disposed on the rear wheels 6c and 6d side. The first triggering device 5a outputs the trigger signal to the right front wheel 6a and the left front wheel 6b as a pair. The second triggering device 5b outputs the trigger signal to the right rear wheel 6c and the left rear wheel 6d as a pair.

On the other hand, the first triggering device 5a can be disposed on the left wheels 6b and 6d side. The second triggering device 5b can be disposed on the right wheels 6a and 6c side. The first triggering device 5a can output the trigger signal to the left wheels 6b and 6d as a pair. The second triggering device 5b can output the trigger signal to the right wheels 6a and 6c as a pair.

In this case, if the first triggering device 5a is disposed closer to one wheel than the other, among the left wheels 6b and 6d, and the second triggering device 5b is disposed closer to one wheel than the other, among the left wheels 6a and 6c, the reception strengths become different values when the first triggering device 5a and the second triggering device 5b output the trigger signals. Therefore, the same advantages as those acquired according to the embodiment can be achieved.

According to the embodiment, when the triggering device 5 is the first triggering device 5a and the second triggering device 5b is explained.

However, if the trigger signal can reach all transceivers 2, a single triggering device 5 can be provided so that the distances from the triggering device 5 to each wheel 6a to 6d all differ. In this case, four pieces of reception strength data are acquired, each from the transceivers 2 of the wheels 6a to 6d. whether the reception strength data is to be used can be judged by judgment of whether the four pieces of reception strength data are each within the expected reception strength range using the relationship of the distance between the triggering device 5 and each transceiver 2.

According to the embodiment, when the invention according to the embodiment is applied to a four-wheel vehicle is described. However, the vehicle is not limited to the four-wheel vehicle. The present invention can be applied to a wheel position detecting device and a tire air pressure detecting device provided in a vehicle including more than four wheels, such as a large vehicle.

According to the embodiment, whether the vehicle 1 is moving is detected based on the detection signal from the speed sensor 8. However, the detection can be performed based other known signals and on detection signals from a wheel speed sensor, a longitudinal acceleration sensor, and the like.

The steps shown in the diagrams correspond to means performing the various processes.

What is claimed is:

1. A detecting apparatus that detects positions of a plurality of wheels provided on a vehicle, the apparatus comprising a plurality of transceivers, one of the plurality of transceivers being mounted on each of the plurality of wheels of the vehicle, and a receiver being mounted on a body of the vehicle, each of the plurality of transceivers comprising:
 a wheel-mounted receiving unit that receives a trigger signal sent from the vehicle-mounted receiver;
 a first controlling unit that detects a reception strength of the trigger signal and produces reception strength data representing the reception strength; and
 a transmitting unit that transmits the reception strength data to the vehicle-mounted receiver;
and
the vehicle-mounted receiver comprising:
 a triggering unit that sends out the trigger signal to at least two of the plurality of transceivers;
 a second receiving unit that receives the reception strength data from the transceiver transmitting units;
 a second controlling unit that determines whether or not to adopt the reception strength data for detecting the positions of the wheels depending on whether or not the reception strength of the trigger signal is within a predetermined range assigned to the trigger signal; and
 a detection unit that detects the respective positions of the wheels using the reception strength data only if the reception strength of the trigger signal is within the predetermined range, where reception strength data are also used for detecting the positions of the wheels.

2. The detecting apparatus of claim 1, wherein the second controlling unit comprises:
 determination means for determining whether or not there is an unusual reception state where the second receiving unit fails to receive at least one of the reception strength datum or at least one of the reception strength datum is not within the predetermined range; and
 first instruction means for instructing the triggering unit to resend the trigger signal to the plurality of transceivers if the determination means determines that there is an unusual reception state.

3. The detecting apparatus of claim 2, wherein the second controlling unit comprises:
 detection means for detecting whether or not the vehicle is running, and
 second instruction means for instructing the triggering unit to send the trigger signal to the plurality of transceivers when the detection means detects that the vehicle is running.

4. The detecting apparatus of claim 2, wherein:
 the triggering unit comprises a first and second triggering units, the first triggering unit sending the trigger signal to a first group of transceivers selected among the plurality of transceivers, the second triggering unit sending the trigger signal to a second group of the plurality of transceivers, and
 the second control unit comprises:
 third instruction means for instructing a respectively corresponding one of the first and second triggering units to resend the trigger signal to either the first group of transceivers or the second group of transceivers when the determination means determines that there is the unusual reception state, the respectively corresponding one of the first and second triggering units being the triggering unit in charge of sending out the triggering signal to the transceiver, among the wheels, of a wheel to which the determination means determines that there is the unusual reception state.

5. The detecting apparatus of claim 4, wherein:
the wheels are front wheels and rear wheels respectively provided on front and rear sides of the vehicle,
the first group of transceivers consists of the transceivers provided to the front wheels, and
the second group of transceivers consists of the transceivers provided to the rear wheels.

6. The detecting apparatus of claim 1, wherein the second controlling unit further comprises:
a judging unit that judges whether or not the number of reception strength data, of which reception strength is within the predetermined range, is a predetermined number, and
fourth instruction means for instructing the triggering unit to resend the trigger signal when the judging unit judges that the number of reception strength data is different from the predetermined number.

7. A detecting apparatus for detecting an air-pressure of a tires of a plurality of wheels of a vehicle, said apparatus comprising:
a wheel position detecting apparatus that detects respective positions of the wheels, the wheel position detecting apparatus comprising a plurality of transceivers, one of the plurality of transceivers being mounted on each of the wheels of the vehicle, and a receiver being mounted on a body of the vehicle,
wherein each of the plurality of transceivers comprises:
a wheel-mounted receiving unit that receives a trigger signal sent from the vehicle-mounted receiver,
a first controlling unit that detects a reception strength of the trigger signal and produces reception strength data representing the reception strength, and
a transmitting unit that transmits the reception strength data to the vehicle-mounted receiver;
wherein the vehicle-mounted receiver comprises:
a triggering unit that sends out the trigger signal to at lest two of the plurality of transceivers,
a vehicle-mounted receiving unit that receives the reception strength data from the transceivinq unit,
a second controlling unit that determines whether or not to adopt the reception strength data for detecting the respective positions of the wheels depending on whether or not the reception strength of the trigger signal is within a predetermined range assigned to that trigger signal, and
a detection unit that detects the respective positions of the wheels using the reception strength data only when the reception strength of the trigger signal is within the predetermined range whereupon the reception strength data are used for detecting the respective positions of the wheels; and
wherein each of the plurality of transceivers further comprises a sensor sensing the air-pressure and outputting a signal representing the sensed air-pressure to the first control unit,
the first control unit produces a sensed air-pressure data representing the sensed air-pressure and outputs the sensed air-pressure data to the transmitting unit,
the transmitting unit transmits the sensed air-pressure data, and
the second controlling unit detects the air-pressure of each of the tires based on the sensed air-pressure data.

8. The detecting apparatus of claim 7, wherein the second controlling unit comprises:
determination means for determining whether or not there is an unusual reception state where the second receiving unit fails to receive at least one of the reception strength datum or at least one of the reception strength datum is not within the predetermined range; and
first instruction means for instructing the triggering unit to resend the trigger signal to the plurality of transceivers when the determination means determines that there is the unusual reception state.

9. The detecting apparatus of claim 8, wherein the second controlling unit comprises:
detection means for detecting whether or not the vehicle is running; and
second instruction means for instructing the triggering unit to send the trigger signal to the plurality of transceivers when the detection means detects that the vehicle is running.

10. The detecting apparatus of claim 8, wherein:
the triggering unit comprises a first and second triggering units, the first triggering unit sending the trigger signal to a first group of transceivers selected among the plurality of transceivers, the second triggering unit sending the trigger signal to a second group of the plurality of transceivers, and
the second control unit comprises:
third instruction means for instructing a respectively corresponding one of the first and second triggering units to resend the trigger signal to either the first group of transceivers or the second group of transceivers when the determination means determines that there is the unusual reception state, the respectively corresponding one of the first and second triggering units being the one in charge of sending out the triggering signal to the transceiver, among the wheels, of a wheel to which the determination means determines that there is the unusual reception state.

11. The detecting apparatus of claim 10, wherein:
the wheels are front wheels and rear wheels respectively provided on front and rear portions of the vehicle,
the first group of transceivers consists of the transceivers provided to the front wheels, and
the second group of transceivers consists of the transceivers provided to the rear wheels.

12. The detecting apparatus of claim 7, wherein the second controlling unit further comprises:
a judging unit that judges whether or not the number of reception strength data of which reception strength is within the predetermined range is a predetermined number, and
fourth instruction means for instructing the triggering unit to resend the trigger signal when the judging unit judges that the number of reception strength data is different from the predetermined number.

13. Apparatus for detecting the current position of each of plural wheels mounted on a vehicle body and having wheel identification (ID) data respectively associated therewith, said apparatus comprising:
a wheel-mounted transceiver on each of said plural wheels;
a vehicle body-mounted transceiver configured to send trigger signals to a plurality of said wheel-mounted transceivers from at least one location that is disposed at different respective distances from each of said wheel-mounted transceivers;

each said wheel-mounted transceiver being configured to measure a received trigger signal strength, to generate respectively corresponding received trigger signal strength data representing said measured signal strength and to transmit said trigger signal strength data back to said vehicle body-mounted transceiver together with wheel identification (ID) data for its respectively corresponding wheel;

said vehicle body-mounted transceiver including computation circuits configured to:
   a) determine whether reported trigger signal strength data is within one of plural possible predetermined ranges respectively corresponding to possible wheel positions; and
   b) only if so, then using the reported trigger signal strength data to determine which position currently corresponds to a respectively corresponding wheel ID.

14. A method for detecting the current position of each of plural wheels mounted on a vehicle body and having wheel identification (ID) data respectively associated therewith, said method comprising:

sending a trigger signal from a vehicle body-mounted transceiver to a plurality of wheel-mounted transceivers from at least one location that is disposed at different respective distances from each of said wheel-mounted transceivers;

at each said wheel-mounted transceiver, measuring a received trigger signal strength, to generate respectively corresponding received trigger signal strength data representing said measured signal strength and to transmit said trigger signal strength data back to said vehicle body-mounted transceiver together with wheel identification (ID) data for its respectively corresponding wheel;

using computation circuits configured to:
   a) determine whether reported trigger signal strength data is within one of plural possible predetermined ranges respectively corresponding to possible wheel positions; and
   b) only if so, then using the reported trigger signal strength data to determine which position currently corresponds to a respectively corresponding wheel ID.

* * * * *